(12) United States Patent
Balan et al.

(10) Patent No.: US 7,266,940 B2
(45) Date of Patent: Sep. 11, 2007

(54) SYSTEMS AND METHODS FOR POWER GENERATION WITH CARBON DIOXIDE ISOLATION

(75) Inventors: Chellappa Balan, Niskayuna, NY (US); Michael John Bowman, Niskayuna, NY (US); Joell Randolph Hibshman, II, Delanson, NY (US); Andrei Tristan Evulet, Clifton Park, NY (US); Jennifer Lynn Molaison, Marietta, GA (US)

(73) Assignee: General Electric Company, Niskayuna, NY (US)

( * ) Notice: Subject to any disclaimer, the term of this patent is extended or adjusted under 35 U.S.C. 154(b) by 33 days.

(21) Appl. No.: 11/178,165

(22) Filed: Jul. 8, 2005

(65) Prior Publication Data

US 2007/0006592 A1 Jan. 11, 2007

(51) Int. Cl.
*F02C 6/00* (2006.01)
(52) U.S. Cl. ............................. 60/39.181; 60/39.183; 60/698
(58) Field of Classification Search ............... 60/39.15, 60/39.181, 39.182, 39.183, 698
See application file for complete search history.

(56) References Cited

U.S. PATENT DOCUMENTS

| 3,054,257 | A | * | 9/1962 | Schelp ....................... 60/39.17 |
| 4,987,735 | A | * | 1/1991 | DeLong ....................... 60/774 |
| 5,541,014 | A | * | 7/1996 | Micheli et al. ................ 429/19 |
| 6,155,039 | A | * | 12/2000 | Agee et al. .................... 60/780 |
| 6,260,346 | B1 | * | 7/2001 | Jansson et al. ................ 60/780 |
| 6,260,348 | B1 | | 7/2001 | Sugishita et al. .......... 60/39.12 |
| 6,430,916 | B2 | | 8/2002 | Sugishita et al. .......... 60/39.12 |
| 6,832,485 | B2 | | 12/2004 | Sugarmen et al. ............ 60/780 |
| 2005/0126156 | A1 | * | 6/2005 | Anderson et al. .......... 60/39.12 |

\* cited by examiner

*Primary Examiner*—Hoang Nguyen
(74) *Attorney, Agent, or Firm*—Fletcher Yoder

(57) ABSTRACT

A power generation system and method includes a first gas turbine system comprising a first combustion chamber configured to combust a first fuel stream of primarily hydrogen that is substantially free of carbon-based fuels. The first gas turbine system also includes a first compressor configured to supply a first portion of compressed oxidant to the first combustion chamber and a first turbine configured to receive a first discharge from the first combustion chamber and generate a first exhaust and electrical energy. The power generation system further includes a second gas turbine system comprising a second combustion chamber configured to combust a second fuel stream to generate a second discharge. The first compressor of the first gas turbine system is configured to supply a second portion of compressed oxidant to the second combustion chamber. The second turbine system also includes a second turbine configured to receive the second discharge from the second combustion chamber to generate a second exhaust and electrical energy and a second compressor configured to receive the second discharge comprising carbon dioxide. The second compressor is also configured to discharge a recycle stream to the second combustion chamber and a split stream to a separator system adapted to recover carbon dioxide.

19 Claims, 3 Drawing Sheets

SYSTEMS AND METHODS FOR POWER GENERATION WITH CARBON DIOXIDE ISOLATION

BACKGROUND

The invention relates generally to power generation and the efficient recovery of carbon dioxide. More particularly, the invention relates to the integration of gas-turbine exhaust compression/recirculation with carbon dioxide separation/recovery.

Power generation systems that combust fuels containing carbon (e.g., fossil fuels) produce carbon dioxide ($CO_2$) as a byproduct, because in the combustion, carbon is converted to $CO_2$. Removal or recovery of the carbon dioxide ($CO_2$) from power generation systems, such as from the exhaust of a gas turbine, is generally not economical due to low $CO_2$ content and low (ambient) pressure of the exhaust. Therefore, unfortunately, the exhaust containing the $CO_2$ is typically released to the atmosphere, and does not get sequestered into oceans, mines, oil wells, geological saline reservoirs, and so on. There is a need for a technique that provides for economical recovery of $CO_2$ discharged from power generation systems (e.g., gas turbines) that rely on carbon-containing fuels.

BRIEF DESCRIPTION

In one aspect, a power generation system includes a first gas turbine system comprising a first combustion chamber configured to combust a first fuel stream of primarily hydrogen that is substantially free of carbon-based fuels. The first gas turbine system also includes a first compressor configured to supply a first portion of compressed oxidant to the first combustion chamber and a first turbine configured to receive a first discharge from the first combustion chamber and generate a first exhaust and electrical energy. The power generation system further includes a second gas turbine system comprising a second combustion chamber configured to combust a second fuel stream to generate a second discharge. The first compressor of the first gas turbine system is configured to supply a second portion of compressed oxidant to the second combustion chamber. The second turbine system also includes a second turbine configured to receive the second discharge from the second combustion chamber to generate a second exhaust and electrical energy and a second compressor configured to receive the second discharge comprising carbon dioxide. The second compressor is also configured to discharge a recycle stream to the second combustion chamber and a split stream to a separator system adapted to recover carbon dioxide.

In yet another aspect, a power generation system includes a first turbine system configured to combust a hyrdogen-rich stream substantially free of carbon-based fuels and to discharge an exhaust substantially free of carbon dioxide. The power generation system also includes a second turbine system configured to combust carbon-based fuels and to discharge a compressed stream rich in carbon dioxide to a carbon dioxide separator adapted to recover the carbon dioxide A compressor in the first turbine system is configured to supply air to the second turbine system. The power generation system does not discharge substantial amounts of carbon dioxide to the atmosphere.

In another aspect a method includes combusting hydrogen and a first portion of compressed oxidant in a first turbine system discharging a first exhaust from the first turbine system that is substantially free of carbon dioxide. The method includes introducing a second portion of compressed air from the first turbine system to a second turbine system and combusting carbon-based compounds in the second turbine system and generating a second exhaust comprising carbon dioxide. The method further includes internally recycling within the second turbine system the second exhaust of the second turbine system to concentrate carbon dioxide within the second turbine system and recovering the carbon dioxide from the second exhaust in a carbon dioxide separator.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique provides for two or more exemplary gas turbine systems operating in a power generation system to share a common supply of compressed oxidant. As a result, compression capacity may be freed in one or more of the turbine systems to be employed in the recovery of carbon dioxide ($CO_2$) generated by one or more of the turbine systems. In one example, a compressor in a first turbine system supplies oxidant (via conduits) to a combustion chamber in the first turbine system and also to a combustion chamber in a second turbine system, freeing a compressor in the second turbine system. As discussed below, this freed compression capacity may be employed in the separation and recovery of carbon dioxide ($CO_2$) and other components from the exhaust of one or more of the gas turbines. The recovered $CO_2$ may be sold as product or consumed on-site as feed in other processes, for example. Further, such recovery of $CO_2$ may reduce the amount of $CO_2$ emitted to the environment from the power generation system. Additionally, as discussed below, the reforming (e.g., via steam) of hydrocarbon fuel may be integrated with operation of the gas turbine systems to further reduce the amount $CO_2$ emitted to the environment.

In certain configurations, at least one turbine system (i.e., the first turbine system) may combust hydrogen and, therefore, discharges an exhaust having substantially no carbon dioxide. Moreover, the hydrogen feed may be generated locally by reforming carbon-based fuels (e.g., natural gas, propane, etc.), for example. Another turbine system (i.e., the second turbine system) may combust hydrocarbons or carbon-based fuels and, therefore, discharges an exhaust having carbon dioxide. As indicated, the freed compressor in the second turbine system may be utilized to facilitate separation and recovery of $CO_2$ from the exhaust of the second turbine, and ultimately reduce emissions from the second turbine system. Advantageously, the overall result may be a power generation system that consumes carbon-based fuels such as natural gas without emitting substantial amounts of $CO_2$ to the environment. Again, the recovered $CO_2$ may also provide an economic benefit, e.g., sold or consumed locally.

Lastly, while the discussion may focus on two turbine systems, one combusting primarily hydrogen and the other combusting carbon-based fuels, it should emphasize that both turbine systems with the present technique may combust carbon-based fuels. If so, CO2 emissions may still be reduced, i.e., by half or more, depending on the particular configuration. Further, the present technique encompasses a variety of process configurations, including the employment of more than two turbine systems, the feeding of exhaust having CO2 from one turbine system combusting hydrocarbon to a compressor in another turbine system also combusting hydrocarbon, and so forth.

Figure 1:
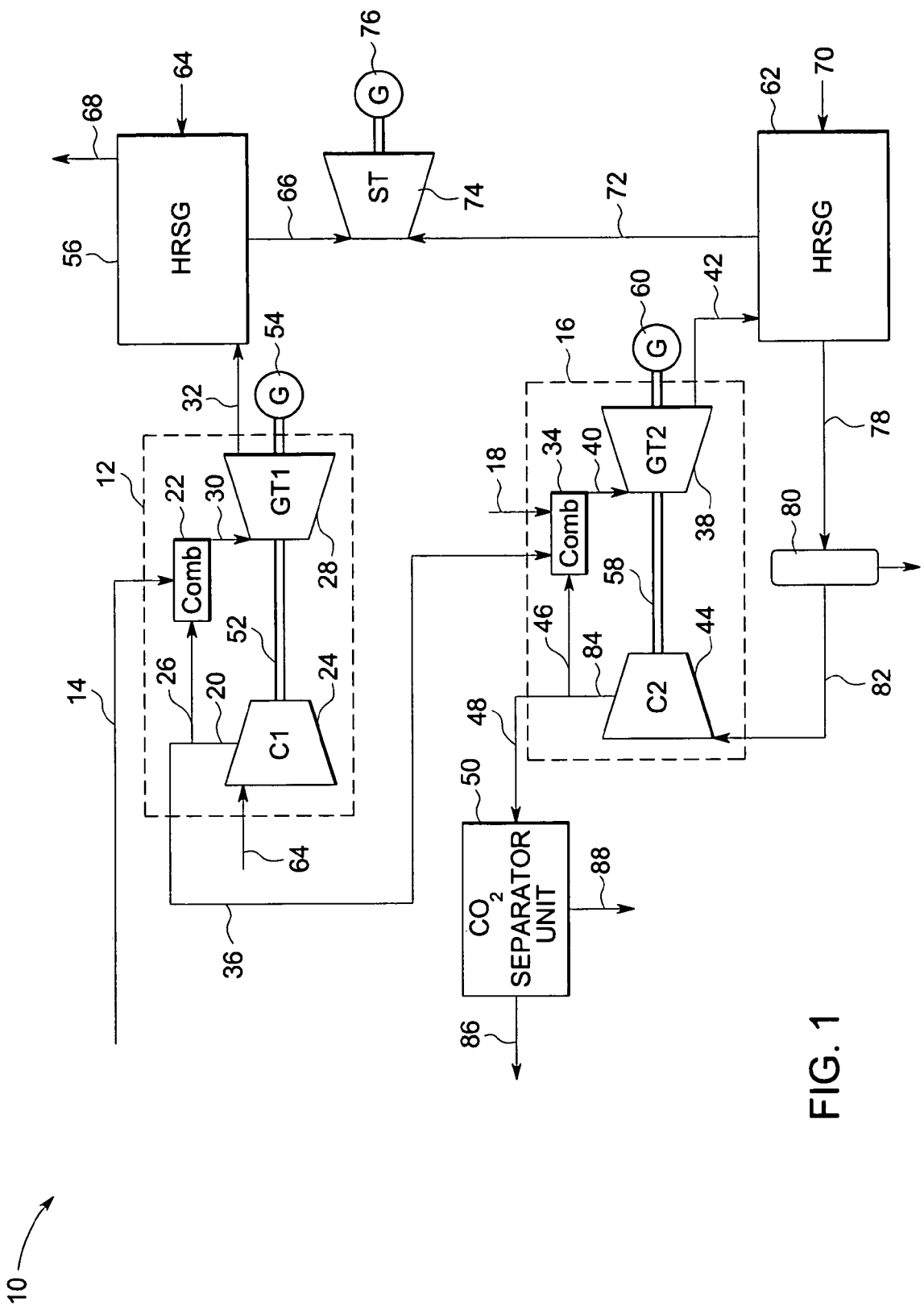
FIG. 1 is a flow diagram of an exemplary integrated power generation system with carbon dioxide separation system in accordance with embodiments of the present technique.

Turning now to the drawings, FIG. 1 illustrates an exemplary power generation system 10 having a first gas turbine system 12 configured for hydrogen feed 14 and a second gas turbine system 16 configured for hydrocarbon feed 18 (e.g., natural gas, propane, etc.). In the illustrated embodiment, oxidant is supplied via oxidant conduit 20 from the first gas turbine system 12 to the second gas turbine system 16.

In this example, the first turbine system 12 includes a first combustion chamber 22 configured to combust a first fuel stream (hydrogen feed 14 of primarily hydrogen that is substantially free of carbon-based fuels, a first compressor 24 configured to supply a first portion of compressed oxidant 26 to the first combustion chamber 22, and a first turbine 28 configured to receive a first discharge 30 from the first combustion chamber 22 and generate a first exhaust 32 and electrical energy. The exemplary power generation system 10 may also include a second gas turbine system 16 having a second combustion chamber 36 configured to combust a second fuel stream (hydrocarbon feed 18), wherein the first compressor 22 of the first gas turbine system 12 is configured to supply oxidant 20 (a second portion of the compressed oxidant 36) to the second combustion chamber 34. The second turbine system 16 may further include a second turbine 38 configured to receive the second discharge 40 from the second combustion chamber 34 to generate a second exhaust 42 and electrical energy and a second compressor 44 configured to receive the second discharge 40 comprising carbon dioxide and to discharge a recycle stream 46 to the second combustion chamber 34 and a split stream 48 to a separator system 50 adapted to recover carbon dioxide from the split stream 48.

In the illustrated embodiment, the first turbine system 12 typically includes a compressor 24, a turbine 28, a rotor 52, by which rotor 52 turbine 28 drives compressor 24. The first turbine system also comprises an electrical generator 454, and a first heat recovery steam generator (hereinafter HRSG) 56. Similarly the second turbine system 16 typically includes a compressor 44, a turbine 38, a rotor 42, by which rotor 58 turbine 38 drives compressor 44. The second turbine system 16 also comprises an electrical generator 60, and a second heat recovery steam generator (hereinafter HRSG) 62.

In operation, exemplary compressors 24 and 44 are multi-stage compressors that include rows of stationary vanes and rotating blades. Compressor 24 inducts air 264 and produces a compressed air stream 20. The compressed air stream 20 is spilt into two streams. A first portion of the compressed air 26 is introduced into the first combustion chamber 22. The first combustion chamber 22 is configured to receive the first fuel stream 14 and the first portion of compressed oxidant 26. The first fuel stream 14 and the oxidant stream 26 may be premixed and injected into the first combustion chamber 22. In some embodiments, the first fuel 14 and the first portion of compressed oxidant 26 may be injected separately into the first combustion chamber 22. In the various embodiments of the power generation systems described herein, the oxidant is ambient air. It is understood that the compressed oxidant 20 from the compressor 24 may comprise any other suitable gas containing oxygen, such as for example, oxygen rich air, oxygen depleted air, and/or pure oxygen. The combustion process in the first combustion chamber 22 generates a first discharge stream 30.

As illustrated, the first discharge stream 30 from the first combustion chamber 22 may be introduced into the first gas turbine 28. As indicated, the power generation system 10 includes a generator 54 attached to the first gas turbine 28. The thermodynamic expansion of the hot first discharge stream 30 fed into the first gas turbine 28 produces power to drive the gas turbine 28, which, in turn, generates electricity through the generator 54. In this embodiment, electricity from the generator 54 may be converted to an appropriate form and is provided to a distribution power supply network grid (not shown). An expanded first exhaust 32 from the first gas turbine 28 may be fed into the first HRSG 56 for recovering the heat content of the expanded first exhaust stream 32. A water stream 64 may be fed into the first HRSG 56, which in turn may generate a first portion of steam 66 at least in part by utilizing the heat recovered from the hot expanded first exhaust stream 32 from the first gas turbine 28. The cooled first exhaust 68 from the first HRSG 56 may be vented into the atmosphere.

The first fuel stream 14 introduced in the first combustion chamber 22 is typically substantially free of any carbon content and may include a relatively high concentration of hydrogen. The source of such quality of fuel may include but is not limited to pipeline supply, truck supply, tube trailer supply, vessels (i.e., spherical storage), a hydrogen storage system capable of storing gaseous or liquid hydrogen, and so on. Alternatively hydrogen can be generated on-site via reforming of hydrocarbons (e.g., via steam) or other processes and used as the first fuel stream 14 for the first turbine system 12 as illustrated in an exemplary system in FIG. 2.

As depicted in FIG. 1, a second portion of compressed oxidant 36 from the first compressor 24 is introduced into the second combustion chamber 34 of the second turbine system 16. A second fuel stream 18 may also be introduced into the second combustion chamber 34 to produce the second discharge stream 40. The second discharge stream 40 is typically expanded in the second turbine 38 to generate the second exhaust stream 42 which exhaust stream 42 may be introduced into the second HRSG 62. In this embodiment, the second HRSG 62 is generally a closed loop HRSG wherein no stream is typically vented into the atmosphere. The heat content of the second exhaust stream 42 may be recovered by a water stream 70 to produce a second portion of steam 72. The first portion of steam 66 generated in the first HRSG 56 and the second portion of the steam 72 generated in the second HRSG 62 may be used in a steam turbine 74 to produce electrical energy through a generator 76, for example.

The second fuel stream 18 may include any suitable hydrocarbon gas or liquid, such as natural gas, methane, naphtha, butane, propane, syngas, diesel, kerosene, aviation fuel, coal derived fuel, bio-fuel, oxygenated hydrocarbon feedstock, and mixtures thereof, and so forth. In one embodiment, the fuel is primarily natural gas (NG) and, therefore, the second discharge stream 40 from the second combustion chamber 34 may include water, carbon dioxide (CO$_2$), carbon monoxide (CO), nitrogen (N$_2$) unburned fuel, and other compounds.

The cooled second exhaust stream 78 from the second HRSG 62 is generally introduced into a moisture separator 80 to separate the water formed in the combustion process in the second combustion chamber 34. The exit stream 82 from the moisture separator 80 typically includes at least CO$_2$, CO, N$_2$ and unburned hydrocarbon. The exit stream 82 is generally compressed in the second compressor 44 to generate a compressed stream 84. In operation, during the initial phase of operation after start-up, the concentration of CO$_2$ in the compressed stream 84 may not be substantial and hence the entire stream may be recycled back to the second combustion chamber 34 as a recycle stream 46. This recycling operation generally increases the CO$_2$ concentration in the compressed stream 84. When the CO$_2$ concentration in the compressed stream 84 reaches a desired level, a slip stream or split stream 48 may be introduced into the downstream CO$_2$ separator unit 50. A control valve configuration (not shown) may be employed to facilitate diversion and introduction of the split stream 48 to the CO2 separator. For example, a control valve may be disposed on the conduit carrying the split stream, and the operation of the control valve tied to an on-line instrument or sensor that measures the concentration CO$_2$ in the compressed stream 84. Lastly, the downstream CO$_2$ separator unit 50 may generate an exit stream 86 having substantially high concentration of CO$_2$ and a lean CO$_2$ stream 88 primarily having CO, unburned fuel and N$_2$.

In this exemplary embodiment as depicted in FIG. 1, substantial carbon dioxide isolation is achieved. As the fuel burned in the first combustion chamber 22 may be substantially pure hydrogen, carbon dioxide is generally not formed during the combustion process in the first combustion chamber 22. The first exhaust 32, generated from the first combustion chamber 22 therefore is free from carbon dioxide and the cooled first exhaust stream 68 vented to atmosphere typically does not release any carbon dioxide. The carbon dioxide produced in the second combustion chamber 34 may be isolated as a concentrated carbon dioxide stream 86 that may be sequestrated or sold in the merchant market depending on the demand for carbon dioxide.

Figure 2:
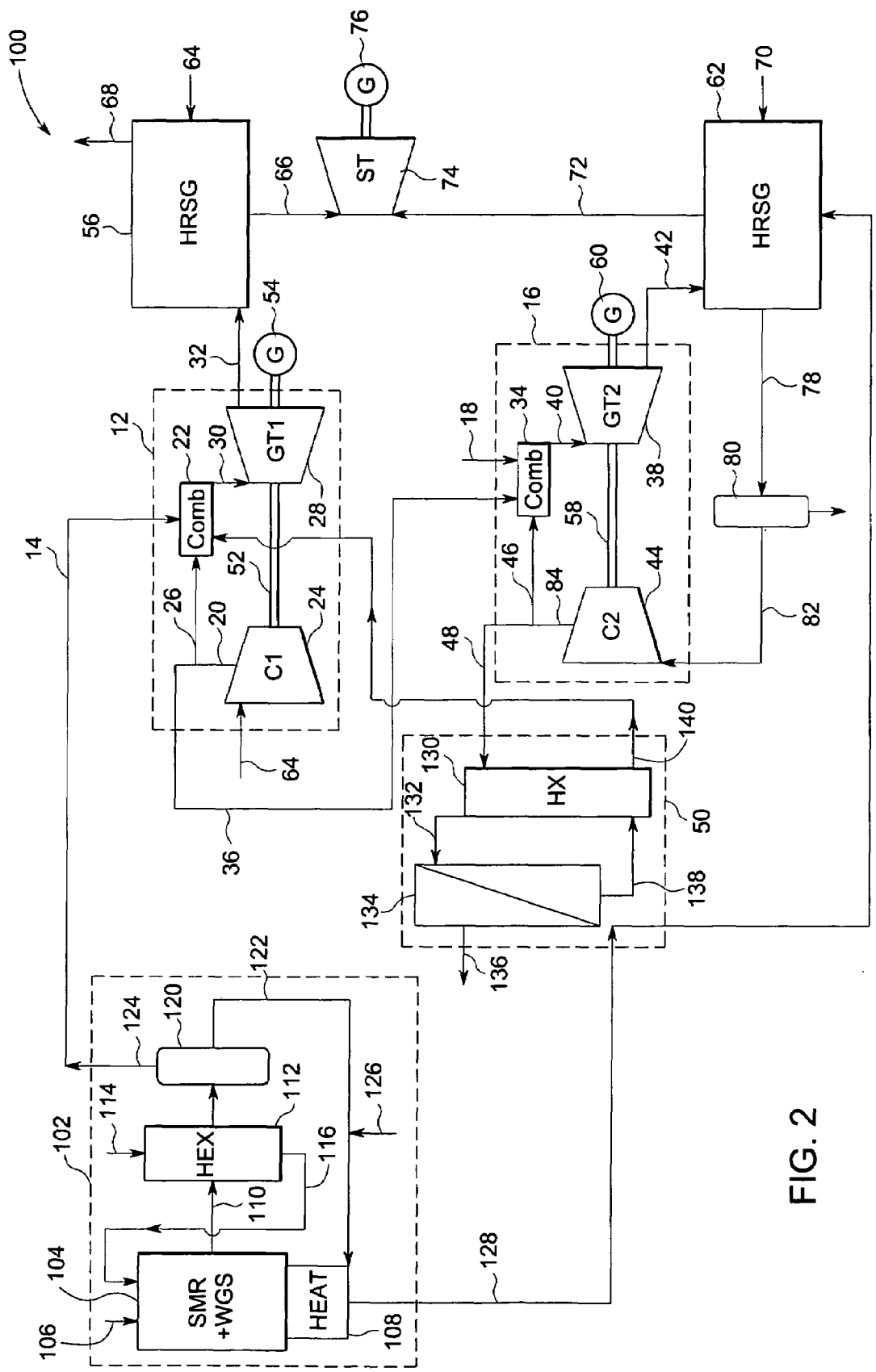
FIG. 2 is a flow diagram of another exemplary power generation system integrated with a hydrogen generation system in accordance with embodiments of the present technique.

FIG. 2 illustrates an exemplary power generation system 100 having a hydrogen generation system 102. In this example, the hydrogen generation system 102 may include a steam-reforming zone 104. A fuel 106 such as natural gas and steam 108 are typically introduced into the reforming zone 104 to produce a reformate stream 110.

Typically, reforming a hydrocarbon fuel, such as natural gas, with steam, produces hydrogen. This process is generally energy intensive (i.e., the steam reforming reaction is endothermic) and significant heat may be absorbed in the overall reforming process. In the example of natural gas, the main constituent is methane (CH$_4$), which reacts with steam in a two-step reaction to produce hydrogen. Through the reforming process, natural gas may be converted to hydrogen following the reactions (1) and (2):

$$CH_4 + H_2O \Rightarrow CO + 3H_2 \qquad (1)$$

$$CO + H_2O \Rightarrow CO_2 + H_2 \qquad (2)$$

At least a portion of the incoming fuel 106 is converted to generate hydrogen by the reforming process in the reforming zone 104. The reforming reaction (1) generally takes place in presence of a suitable steam reforming catalyst, such as nickel. The reforming reaction (1) is typically highly endothermic, having a heat of reaction of approximately 88,630 BTU/mole. Reforming reactions of other hydrocarbon fuels are similarly endothermic. The carbon monoxide and water may react further to produce carbon dioxide in the reforming zone 104. This may be achieved through the exothermic reaction (2), known as a water gas shift reaction. The reformate stream 110 typically includes at least carbon monoxide (CO), carbon dioxide (CO$_2$), hydrogen (H$_2$), unutilized fuel, and water. The hydrogen generation system 102 may include a heat exchanger 112 and a hydrogen separator 120. The reformate stream 110 may be cooled to a temperature within the range of about 200° C. to about 400° C. using the heat exchanger 112 to generate a cooled reformate stream 118. Other exemplary temperature ranges include about 225° C. to about 375° C., and about 250° C. to about 350° C. The cooled reformate stream 118 may be introduced into the separation unit 120, which separation unit 120 separates hydrogen from the cooled reformate stream 118 and produces a hydrogen rich steam 124, and an off gas stream 122.

The inlet fuel stream 106 may comprise any suitable gas or liquid, such as natural gas, methane, naphtha, butane, propane, diesel, kerosene, aviation fuel, coal-derived fuel, bio-fuel, oxygenated hydrocarbon feedstock, and mixtures thereof. Commonly, in some embodiments, the fuel is natural gas (NG).

In the illustrated embodiment, the heat exchanger 112 is configured to extract the heat from the reformate stream 110 and utilize that heat to generate the steam 116 from water 114. The off gas 122 from the hydrogen separator 120 may include water, CO CO$_2$, unburned fuel and hydrogen. In certain embodiments, the off gas stream 122 is mixed with supplemental fuel and oxidant such as air through the stream 126 and introduced in a burner 108 to generate heat for the endothermic reforming reaction in the reforming zone 104. Although the exemplary embodiment as shown in FIG. 2 illustrates the steam methane reforming to be the process for making hydrogen, any other process including but not limited to autothermal reforming, partial oxidation, catalytic partial oxidation may also be used.

The techniques to separate hydrogen from other gases to produce a substantially pure hydrogen rich stream 124 may include pressure swing adsorption (PSA), reverse osmosis, molecular sieve, membrane separation, and other separation techniques. With membranes in particular, a variety of polymers may be used for hydrogen selective membranes, which operate at relatively low temperatures, for example.

In some embodiments, the hydrogen separator 120 may use a cryogenic separation technique. Cryogenic separation may be used when it is important to recover multiple fractionates and multiple products. In one embodiment, the cooled reformate stream 118 is compressed to approximately 900 psia and then cooled to room temperature using a condenser, which liquefies the CO$_2$. Hydrogen can be recovered as a gas from this process, while the CO$_2$ is generally removed as liquid from the bottom of the condenser.

In the illustrated embodiment of FIG. 2, the burner 108 is configured to generate an exhaust stream 128 containing at least water CO$_2$, CO and nitrogen. In this embodiment, the exhaust stream 128 is introduced to the second HRSG 62 to recover the heat content and is mixed with the expanded second exhaust stream 42 and recycled within the second turbine system 16 in order to separate the CO$_2$ content in the exhaust stream 128.

As shown in the embodiment of FIG. 2, the CO$_2$ separator unit 850 has a heat exchanger 130 and a CO$_2$ separator 134. The carbon dioxide separator 134 may apply various techniques known in the art, including but not limited to pressure swing adsorption, chemical absorption and membrane separation, and so forth. To separate the $CO_2$ from the split stream 48. The split stream 48 is introduced into the heat exchanger 130 to reduce the temperature and produce a cooled split stream 132. The cooled split stream 132 is introduced in the $CO_2$ separator 134 to generate a $CO_2$ rich stream 136 and a $CO_2$ lean stream 138. The $CO_2$ lean stream 138 further comprises CO, $N_2$ and un-reacted fuel. The $CO_2$ lean stream 138 is introduced in the heat exchanger 130 to recover the heat content in the split stream 48 and generate a heated lean $CO_2$ stream 140. In one embodiment, the heated lean $CO_2$ stream 140 is introduced into the first combustion chamber 14 to utilize the un-reacted fuel in the heated lean $CO_2$ stream 140.

Pressure swing adsorption (PSA) may be used for separation of carbon dioxide from a mixture of gases. In PSA techniques, at a high partial pressure, solid molecular sieves can adsorb carbon dioxide more strongly than other gases. As a result, at elevated pressures, carbon dioxide is removed from the mixture of gases this mixture is passed through an adsorption bed. Regeneration of the bed is accomplished by depressurization and purging. Typically for critical operations, a plurality of adsorption vessels is used for continuous separation of carbon dioxide, wherein one adsorption bed is used while the others are regenerated.

Another technique for separation of carbon dioxide from a gas stream is chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of $CaCO_3$, which can again reform $CaCO_3$ to CaO.

Membrane separation technology may also be used for separation of carbon dioxide from a gas stream. Membrane processes are generally more energy efficient and easier to operate than absorption processes. The membranes used for high temperature carbon dioxide separation include zeolite and ceramic membranes, which are selective to $CO_2$. However, the separation efficiency of membrane technologies is low, and complete separation of carbon dioxide may not be achieved through membrane separation. Typically membrane separators work more efficiently at higher pressures, and use of a membrane separator to separate the carbon dioxide from the split stream 48 from the second compressor 44 is facilitated by the elevated pressure achieved through the compression in the second compressor 44. The higher pressure available for the separation of $CO_2$ from the split stream 48 also reduces the size of the $CO_2$ separator 134, thereby enhancing the feasibility and the economics of the $CO_2$ separation process.

Yet another technique used for separation of $CO_2$ from the split stream 80 may include, but is not limited to, chemical absorption of $CO_2$ using amines. The split stream 48 may be cooled to a suitable temperature to use chemical absorption of carbon dioxide using amines. This technique is based on alkanol amines solvents that have the ability to absorb carbon dioxide at relatively low temperatures, and are easily regenerated by raising the temperature of the rich solvents. A carbon dioxide rich stream 136 is obtained after regeneration of the rich solvent. The solvents used in this technique may include triethanolamine, monoethanolamine, diethanolamine, diisopropanolamine, diglycolamine, and methyldiethanolamine. Another technique for separating $CO_2$ may be physical absorption. It may be noted that all or combination of any of the techniques described above for $CO_2$ separation may be used to separate $CO_2$ advantageously The exemplary power generation systems as illustrated in FIGS. 1-2 have several advantages. The exemplary systems facilitate clean power generation along with $CO_2$ separation. The only exhaust stream released into the ambient from the system is the cooled first exhaust stream 68 from the first HRSG 56, which cooled first exhaust stream 68 is substantially free of $CO_2$. Therefore lower emission is achieved through this power generation system. The $CO_2$ generated in the process of combustion in the first combustion chamber 122 or in the hydrogen generation system 102 is separated using a $CO_2$ separator and the separated $CO_2$ can be suitable sequestered for oil recovery or sold in the merchant market depending on the demand for carbon dioxide.

The power generation systems disclosed herein have the flexibility to control the production of hydrogen from the reformate stream from the reformer and generation of electrical energy depending on the demand. The hydrogen produced in the disclosed power generation system may be utilized in several ways. The hydrogen produced may be recycled to the combustor to be used as a fuel to achieve carbon dioxide free emission to atmosphere. The hydrogen produced may be stored and transported either in gaseous form or liquid form, such as by means of a liquefaction plant. The hydrogen produced may also be used as a fuel in a fuel cell to generate additional power.

Figure 3:
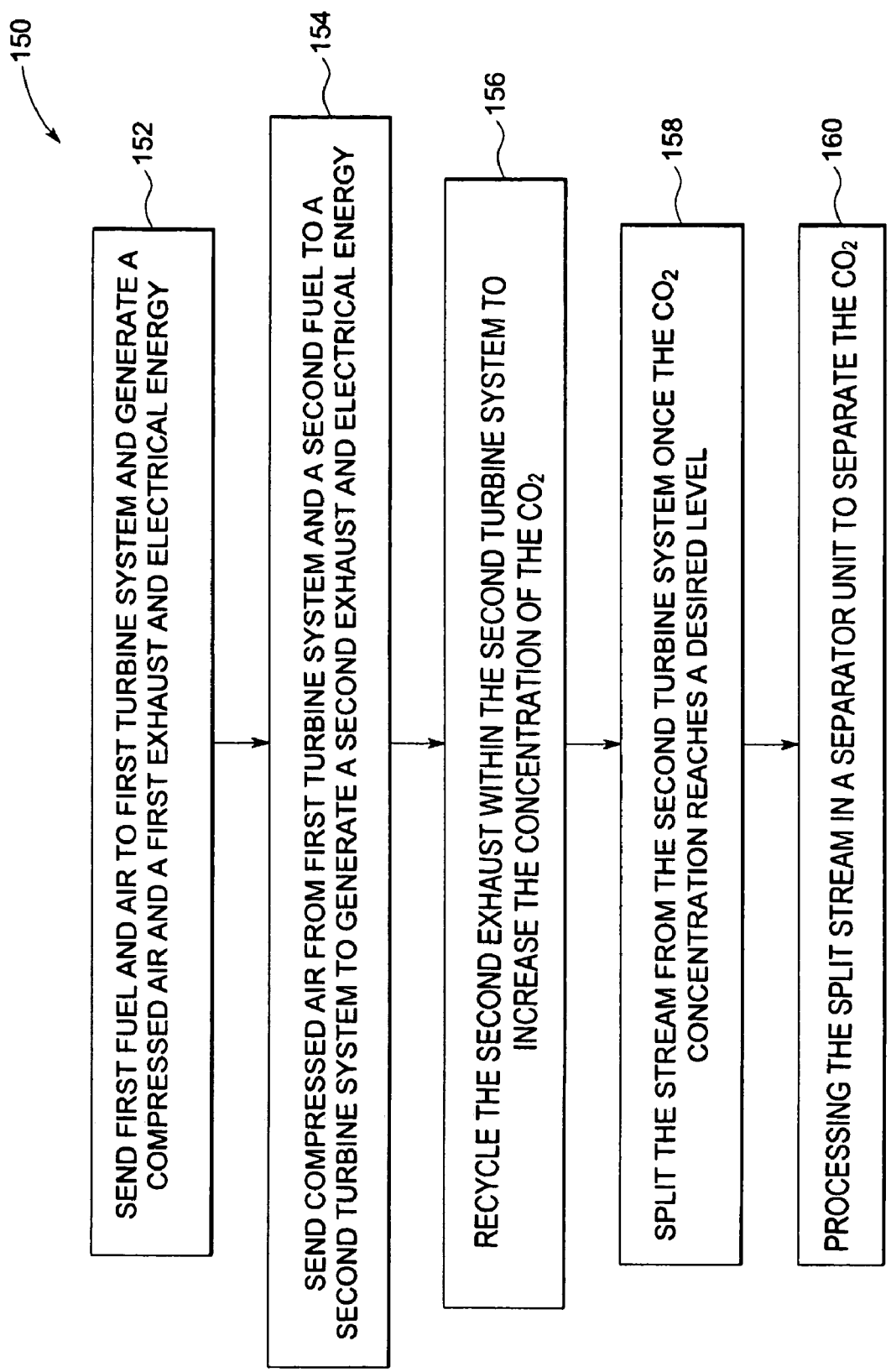
FIG. 3 is a block diagram of an exemplary method for integrating power generation and carbon dioxide recovery in accordance with embodiments of the present technique.

FIG. 3 illustrates an exemplary method 150 for power generation integrated with carbon dioxide separation. The method comprises sending a first fuel and air to a first turbine system and generating a compressed air, a first exhaust and electrical energy as shown in step 152. The method further comprises sending a portion of the compressed air and a second fuel to the second turbine system to generate a second exhaust and electrical energy as shown in step 154. The second exhaust is recycled within the second turbine system until the concentration of $CO_2$ in the second exhaust stream builds up as shown in step 156. Once the concentration in the second exhaust stream reaches a certain level a split stream (or slip stream) is taken from the exit of the second compressor as shown in step 158. The split stream is treated in a $CO_2$ separator in the next step as shown in 160 to generate an exit stream rich in $CO_2$. The method may further comprise generating hydrogen rich fuel for the first turbine system using the reforming process as described in the preceding sections.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
   a first gas turbine system comprising:
   a first combustion chamber configured to combust a first fuel stream of primarily hydrogen that is substantially free of carbon-based fuels;
   a first compressor configured to supply a first portion of compressed oxidant to the first combustion chamber; and
   a first turbine configured to receive a first discharge from the first combustion chamber and generate a first exhaust and electrical energy; and
   a second gas turbine system comprising:
   a second combustion chamber configured to combust a second fuel stream to generate a second discharge, wherein the first compressor of the first gas turbine system is configured to supply a second portion of compressed oxidant to the second combustion chamber; and a second turbine configured to receive the second discharge from the second combustion chamber to generate a second exhaust and electrical energy; and a second compressor configured to receive the second discharge comprising carbon dioxide and to discharge a recycle stream to the second combustion chamber and a split stream to a separator system adapted to recover carbon dioxide.

2. The system of claim 1, wherein the separator system comprises a heat exchanger configured to recover heat from the split stream and a carbon dioxide separator congifured to generate a carbon dioxide rich stream and a carbon dioxide lean stream.

3. The system of claim 2, wherein the the heat exchanger comprises a cross-exchanger configured to exrecover heat from the split stream in exchange with the carbon dioxide lean stream from the carbon dioxide separator.

4. The system of claim 2, wherein the carbon dioxide separator comprises a membrane unit.

5. The system of claim 1, further comprising a first heat recovery steam generator configured to recover heat from the first exhaust and generate a first portion of steam and a second heat recovery steam generator configured to recover heat from the second exhaust and generate a second portion of steam.

6. The system of claim 1, further comprising a hydrogen generation system.

7. The system of claim 6, wherein the hydrogen generation system comprises a reforming zone configured to reform fossil-based fuels to generate a reformate comprising hydrogen.

8. The system of claim 7, wherein the hydrogen generation system further comprises a heat exchanger and a hydrogen separator.

9. The system of claim 8, wherein the hydrogen separator employs pressure swing adsorption.

10. A power generation system comprising:
a first turbine system configured to combust a hyrdogen-rich stream substantially free of carbon-based fuels and to discharge an exhaust substantially free of carbon dioxide; and a second turbine system configured to combust carbon-based fuels and to discharge a compressed stream rich in carbon dioxide to a carbon dioxide separator adapted to recover the carbon dioxide;

wherein a compressor in the first turbine system is configured to supply air to the first turbine system and the second turbine system;

wherein the second turbine system is configured to recycle its exhaust stream internally within the second turbine system to concentrate carbon dioxide for feed to the carbon dioxide separator separator; and wherein the power generation system does not discharge substantial amounts of carbon dioxide to the atmosphere.

11. The system of claim 10, wherein the carbon-based fuels comprise natural gas.

12. The system of claim 10, further comprising a hydrogen generation system configured to a reform carbon-based fuels, wherein the hydrogen generation system is adapted to discharge a hydrogen-rich stream to the first turbine system and an off gas comprising carbon dioxide to a compressor in the second turbine system.

13. A method comprising:
combusting hydrogen and a first portion of compressed oxidant in a first turbine system;

discharge a first exhaust from the first turbine system that is substantially free of carbon dioxide;

introducing a second portion of compressed air from the first turbine system to a second turbine system;

combusting carbon-based compounds in the second turbine system and generating a second exhaust comprising carbon dioxide;

internally recycling within the second turbine system the second exhaust of the second turbine system to concentrate carbon dioxide within the second turbine system; and recovering the carbon dioxide from the second exhaust in a carbon dioxide separator.

14. The method of claim 13, further comprising generating the hydrogen for the combustion in the first turbine system.

15. The method of claim 14 wherein generating the hydrogen comprises reforming a carbon-based fuel.

16. The method of claim 15, comprising substantially isolating the hydrogen and generating an off gas.

17. The method of claim 16, comprising combusting the off gas in a burner to supply heat for the reforming process, wherein combusting of the off gas generates reformer exhaust stream comprising carbon dioxide.

18. The method of claim 17, comprising separating the carbon dioxide from the reformer exhaust stream in the carbon dioxide separator.

19. The method of claim 13, comprising measuring the concentration of carbon dioxide in the recycled second exhaust within the second turbine system.

* * * * *